US007406982B2

(12) United States Patent
Pfaff et al.

(10) Patent No.: US 7,406,982 B2
(45) Date of Patent: Aug. 5, 2008

(54) HYDRAULIC SYSTEM CONTROL METHOD USING A DIFFERENTIAL PRESSURE COMPENSATED FLOW COEFFICIENT

(75) Inventors: Joseph L. Pfaff, Wauwatosa, WI (US); Keith A. Tabor, Richfield, WI (US)

(73) Assignee: HUSCO International, Inc., Waukesha, WI (US)

( * ) Notice: Subject to any disclaimer, the term of this patent is extended or adjusted under 35 U.S.C. 154(b) by 253 days.

(21) Appl. No.: 11/089,482

(22) Filed: Mar. 24, 2005

(65) Prior Publication Data

US 2005/0211312 A1 Sep. 29, 2005

Related U.S. Application Data

(60) Provisional application No. 60/556,116, filed on Mar. 25, 2004.

(51) Int. Cl.
*F16K 31/06* (2006.01)

(52) U.S. Cl. .................... 137/596.17; 91/433; 700/282

(58) Field of Classification Search ............ 137/596.17; 91/433; 700/28–31, 282
See application file for complete search history.

(56) References Cited

U.S. PATENT DOCUMENTS

| | | | | |
|---|---|---|---|---|
| 5,218,820 | A * | 6/1993 | Sepehri et al. | 60/463 |
| 5,249,140 | A * | 9/1993 | Kessler | 700/3 |
| 5,666,806 | A * | 9/1997 | Dietz | 60/327 |
| 5,897,287 | A * | 4/1999 | Berger et al. | 414/699 |
| 6,286,412 | B1 * | 9/2001 | Manring et al. | 91/433 |
| 6,330,525 | B1 * | 12/2001 | Hays et al. | 702/183 |
| 6,467,264 | B1 | 10/2002 | Stephenson et al. | |
| 6,691,603 | B2 * | 2/2004 | Linerode et al. | 91/433 |
| 6,718,759 | B1 | 4/2004 | Tabor | |
| 6,732,512 | B2 | 5/2004 | Pfaff et al. | |
| 6,761,029 | B2 * | 7/2004 | Linerode | 60/459 |
| 6,775,974 | B2 | 8/2004 | Tabor | |
| 6,779,340 | B2 | 8/2004 | Pfaff et al. | |
| 6,848,323 | B2 * | 2/2005 | Krouth et al. | 73/861.47 |
| 6,880,332 | B2 | 4/2005 | Pfaff et al. | |
| 2001/0030309 | A1 * | 10/2001 | Carlson et al. | 251/209 |
| 2004/0076551 | A1 * | 4/2004 | Saidman et al. | 422/100 |
| 2004/0231326 | A1 * | 11/2004 | Imanishi et al. | 60/534 |
| 2005/0112020 | A1 * | 5/2005 | Zeck | 422/4 |

* cited by examiner

*Primary Examiner*—John Rivell
*Assistant Examiner*—Craig M Schneider
(74) *Attorney, Agent, or Firm*—Quarles & Brady; George E. Haas

(57) ABSTRACT

A hydraulic system has an electrohydraulic valve that controls flow of fluid to operate a hydraulic actuator, such as a cylinder or motor. A set of characterization data is provided which describes performance of the electrohydraulic valve as a function of changes in differential pressure across that valve. The hydraulic system is operated by specifying desired movement of the hydraulic actuator and in response deriving a desired valve flow coefficient which designates a level of fluid flow through the electrohydraulic valve. A compensated control signal is produced from the desired valve flow coefficient and the characterization data, to counter act effects that changes in differential pressure have on flow of fluid. The electrohydraulic valve is activated in response to the compensated control signal.

16 Claims, 4 Drawing Sheets

HYDRAULIC SYSTEM CONTROL METHOD USING A DIFFERENTIAL PRESSURE COMPENSATED FLOW COEFFICIENT

CROSS-REFERENCE TO RELATED APPLICATIONS

This application claims benefit of U.S. Provisional Patent Application No. 60/556,116 filed Mar. 25, 2004.

STATEMENT REGARDING FEDERALLY SPONSORED RESEARCH OR DEVELOPMENT

Not Applicable.

BACKGROUND OF THE INVENTION

1. Field of the Invention

The present invention relates to hydraulic systems for operating machinery, and in particular to control algorithms for electrically operating valves in such systems.

2. Description of the Related Art

A wide variety of machines have moveable members which are operated by an hydraulic actuator, such as a cylinder and piston arrangement, that is controlled by a hydraulic valve. Traditionally the hydraulic valve was manually operated by the machine operator. There is a present trend away from manually operated hydraulic valves toward electrical controls and the use of solenoid operated valves. This type of control simplifies the hydraulic plumbing as the control valves do not have to be located near an operator station, but can be located adjacent the actuator being controlled. This change in technology also facilitates sophisticated computerized control of the machine functions.

Application of pressurized hydraulic fluid from a pump to the actuator can be controlled by a proportional solenoid-operated valve. This type of valve employs an electromagnetic coil which moves an armature connected to a valve element, such as a spool or poppet for example, that controls the flow of fluid through the valve. The amount that the valve opens is directly related to the magnitude of electric current applied to the electromagnetic coil, thereby enabling proportional control of the fluid flow. Either the armature or the valve element is spring loaded to close the valve when electric current is removed from the solenoid coil. Alternatively, another electromagnetic coil and armature is provided to move the valve element in the opposite direction.

When an operator desires to move the member on the machine, a joystick is manipulated to produce an electrical signal indicative of the direction and desired rate at which the corresponding hydraulic actuator is to move. The faster the actuator is desired to move, the farther the joystick is moved from its neutral position. A control circuit receives a joystick signal and responds by applying an electric current to the electromagnetic coil which opens the valve by an amount that results in a rate of fluid flow which produces the desired motion of the hydraulic actuator.

Key to the operation of the solenoid-operated valve is the ability of the control circuit to produce the correct magnitude of electric current to open the valve to the proper degree.

SUMMARY OF THE INVENTION

A hydraulic system has an electrohydraulic valve that controls flow of fluid to operate a hydraulic actuator, which may be a cylinder or a motor for example. The method for controlling the fluid flow involves first characterizing performance of the electrohydraulic valve as a function of changes in differential pressure across that valve. This produces valve characterization data which is employed to define a valve flow coefficient which specifies the flow through the valve. The flow coefficient specifies either the conductivity or resistivity of the valve.

During operation of the hydraulic system thereafter, desired movement of the hydraulic actuator is specified, typically in response to the manipulation of an input device by a human operator. A desired valve flow coefficient is derived in response to the desired movement and a compensated control signal is produced from the desired valve flow coefficient and the differential pressure. The compensated control signal is corrected for effects that changes in differential pressure have on flow of fluid through the electrohydraulic valve. The compensated control signal is used to set an electric current level for operating the electrohydraulic valve.

In one embodiment of the present control technique, a compensation function is defined from the characterization data and produces a compensation value that specifies an amount that the valve flow coefficient varies with changes in differential pressure. The desired valve flow coefficient and the actual differential pressure are applied as inputs to the compensation function, which responds by producing the compensation value. That compensation value is added to the desired valve flow coefficient, thereby creating a compensated valve flow coefficient. A transfer function converts the compensated valve flow coefficient into an electric current level and the electrohydraulic valve is operated in response to the electric current level.

In another embodiment of the control technique, a transfer function converts the desired valve flow coefficient into an electric current level. A compensation function is defined from the characterization data and produces a compensation value that specifies an amount that the valve flow at different electric current levels varies with changes in differential pressure. The electric current level and the actual differential pressure are applied as inputs to the compensation function which responds by producing a compensation value. That compensation value is added to the electric current level, thereby creating a compensated current level. The compensated current level then is employed to operate the electrohydraulic valve.

DETAILED DESCRIPTION OF THE INVENTION

Figure 1:
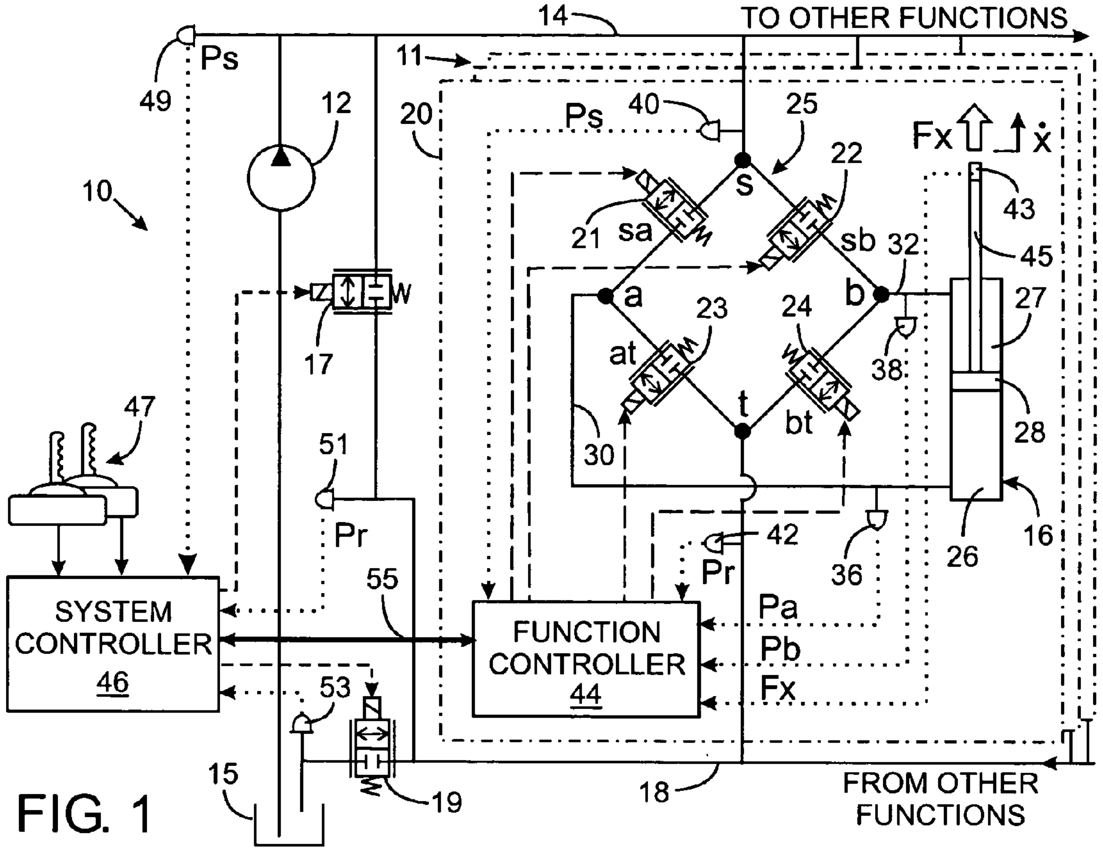
FIG. 1 is a schematic diagram of an exemplary hydraulic system incorporating the present invention.

With initial reference to FIG. 1, a hydraulic system 10 of a machine has mechanical elements operated by hydraulically driven actuators, such as cylinder 16 or rotational motors. The hydraulic system 10 includes a positive displacement pump 12 that is driven by an engine or electric motor (not shown) to draw hydraulic fluid from a tank 15 and furnish the hydraulic fluid under pressure to a supply line 14. The supply line 14 is connected to a tank return line 18 by an unloader valve 17 and the tank return line 18 is connected by tank control valve 19 to the system tank 15. The unloader and tank control valves are dynamically operated to control the pressure in the associated line.

The supply line 14 and the tank return line 18 are connected to a plurality of hydraulic functions on the machine on which the hydraulic system 10 is located. One of those functions 20 is illustrated in detail and other functions 11 have similar components. The hydraulic system 10 is a distributed type in that the valves for each function and control circuitry for operating those valves are located adjacent to the actuator for that function.

In the given function 20, the supply line 14 is connected to node "s" of a valve assembly 25 which has a node "t" connected to the tank return line 18. The valve assembly 25 includes a workport node "a" that is connected by a first hydraulic conduit 30 to the head chamber 26 of the cylinder 16, and has another workport node "b" coupled by a second conduit 32 to the rod chamber 27 of cylinder 16. Four electrohydraulic proportional valves 21, 22, 23, and 24 control the flow of hydraulic fluid between the nodes of the valve assembly 25 and thus control fluid flow to and from the cylinder 16. The first electrohydraulic proportional valve 21 is connected between nodes s and a, and is designated by the letters "sa". Thus the first electrohydraulic proportional valve 21 controls the flow of fluid between the supply line 14 and the head chamber 26 of the cylinder 16. The second electrohydraulic proportional valve 22, denoted by the letters "sb", is connected between nodes "s" and "b" and controls fluid flow between the supply line 14 and the cylinder rod chamber 27. The third electrohydraulic proportional valve 23, designated by the letters "at", is connected between node "a" and node "t" to control fluid flow between the head chamber 26 and the return line 18. The fourth electrohydraulic proportional valve 24, which is between nodes "b" and "t" and designated by the letters "bt", can control the flow between the rod chamber 27 and the return line 18.

The hydraulic components for the given function 20 also include two pressure sensors 36 and 38 which detect the pressures Pa and Pb within the head and rod chambers 26 and 27, respectively, of cylinder 16. Another pressure sensor 40 measures the pump supply pressure Ps at node "s", while pressure sensor 42 detects the return line pressure Pr at node "t" of the valve assembly 25.

The pressure sensors 36, 38, 40 and 42 provide input signals to a function controller 44 which produces signals that operate the four electrohydraulic proportional valves 21-24. The function controller 44 is a microcomputer based circuit which receives other input signals from a system controller 46, as will be described. A software program executed by the function controller 44 responds to those input signals by producing output signals that selectively open the four electrohydraulic proportional valves 21-24 by specific amounts to properly operate the cylinder 16.

The system controller 46 supervises the overall operation of the hydraulic system 10 exchanging signals with the function controllers 44 over a communication link 55 using a conventional message protocol. The system controller 46 also receives signals from a supply line pressure sensor 49 at the outlet of the pump 12, a return line pressure sensor 51, and a tank pressure sensor 53. The tank control valve 19 and the unloader valve 17 are operated by the system controller in response to those pressure signals.

Figure 2:
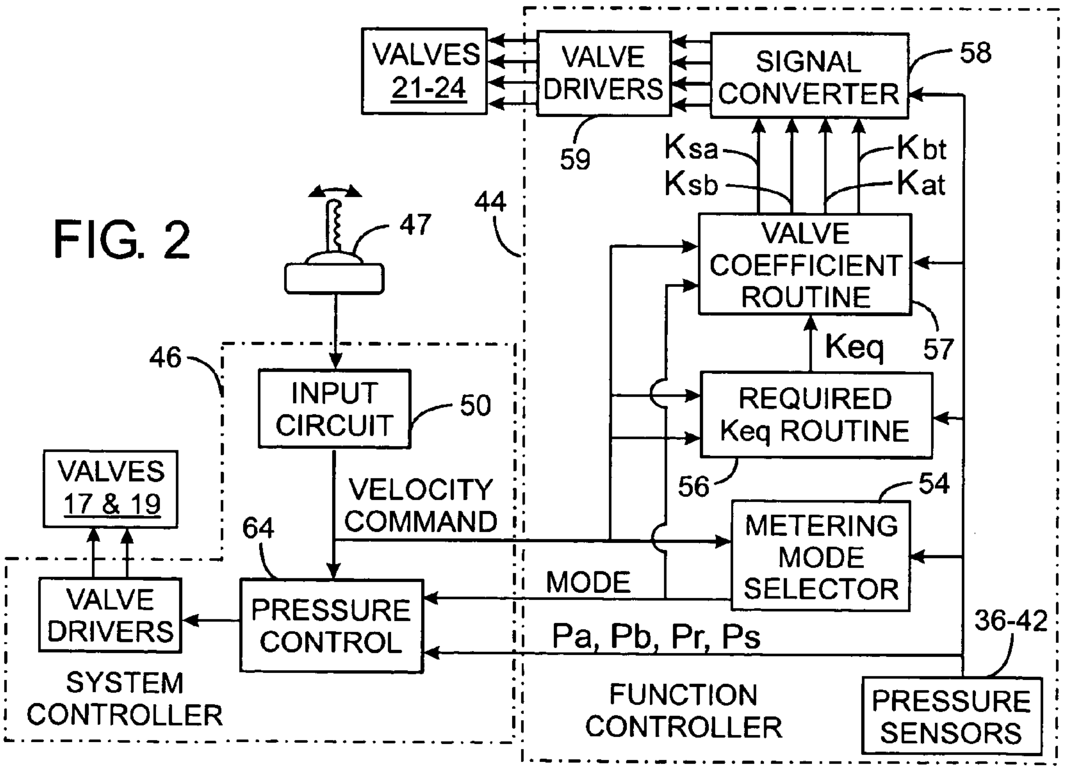
FIG. 2 is a control diagram for one function of the hydraulic system.

With reference to FIG. 2, the control functions for the hydraulic system 10 are distributed among the different controllers 44 and 46. Considering a single function 20, the output signals from the joystick 47 for that function are inputted to the system controller 46. Specifically, the output signal from the joystick 47 is applied to an input circuit 50 which converts the signal indicating the joystick position into a motion signal, for example in the form of a velocity command signal indicating a desired velocity for the hydraulic actuator 16.

The resultant velocity command is sent to the function controller 44 which operates the electrohydraulic proportional valves 21-24 that control the hydraulic actuator for the associated function 20. The desired velocity of the hydraulic actuator 16 can be achieved by metering fluid through the valves 21-24 in several different manners, referred to as metering modes. When the function has a hydraulic cylinder 16 and piston 28 as in FIG. 1, hydraulic fluid is supplied to the head chamber 26 to extend the piston rod 45 from the cylinder or is supplied to the rod chamber 27 to retract the piston rod 45.

The fundamental metering modes in which fluid from the pump 12 is supplied to one of the cylinder chambers 26 or 27 and drained to the return line from the other chamber are referred to as "powered metering modes", specifically powered extension or powered retraction modes. The hydraulic system also may employ regeneration metering modes in which fluid being drained from one cylinder chamber is fed back through the valve assembly 25 to supply the other cylinder chamber. In a regeneration mode, the fluid can flow between the chambers through either the supply line node "s", referred to as "high side regeneration" or through the return line node "t" in "low side regeneration". Note that when fluid is forced from the head chamber 26 into the rod chamber 27 of a cylinder, a greater volume of fluid is draining from the head chamber than is required to fill the smaller rod chamber. In this case, the excess fluid flows into the return line 18 from which it continues to flow either to the tank 15 or to another function 11. Inversely, when fluid is regeneratively forced from the rod chamber 27 into the head chamber 26 the additional fluid required to fill the head chamber is drawn from the supply line 14 or the return line 18.

The metering mode is determined by a metering mode selector 54 for the associated hydraulic function. The metering mode selector 54 preferably is implemented by a software algorithm executed by the function controller 44 to determine the optimum metering mode at a particular point in time. In this latter case, software selects the metering mode in response to the cylinder chamber pressures Pa and Pb and the supply and return lines pressures Ps and Pr at the particular function. Once selected, the metering mode is communicated to the system controller 46 and other routines of the respective function controller 44.

Valve Control

Although the present invention can be used to properly control the valves 21-24 in any of the metering modes, operation in only the powered metering modes will be described to simplify the explanation of the present invention.

The function controller 44 also executes software routines 56 and 58 to determine how to operate the electrohydraulic proportional valves 21-24 to achieve the commanded velocity and desired workport pressures. In each metering mode, only two of the electrohydraulic proportional valves in assembly 25 are active, or open at any point in time. The two valves in the hydraulic circuit branch for the function can be modeled by a single coefficient representing the equivalent fluid conductance of the hydraulic circuit branch in the selected metering mode. The exemplary hydraulic circuit branch for function 20 includes the valve assembly 25 connected to the cylinder 16. The equivalent conductance coefficient (Keq) then is used to calculate a set of individual valve conductance coefficients (Ksa, Ksb, Kat and Kbt), which characterize fluid flow through each of the four electrohydraulic proportional valves 21-24 and thus the amount, if any, that each valve is to open. Those skilled in the art will recognize that in place of these conductance coefficients, the inversely related flow restriction coefficients can be used to characterize the fluid flow. Both conductance and restriction coefficients characterize the flow of fluid in a section or component of a hydraulic system and are inversely related parameters. Therefore, the generic terms "equivalent flow coefficient" and "valve flow coefficient" are used herein to cover both conductance and restriction coefficients.

The nomenclature used to describe the algorithms which implement the present control technique is given in Table 1.

TABLE 1

NOMENCLATURE

| | |
|---|---|
| a | denotes items related to head side of cylinder |
| b | denotes items related to rod side of cylinder |
| Aa | piston area in the head cylinder chamber |
| Ab | piston area in the rod cylinder chamber |
| Fx | equivalent external force on cylinder in the direction of velocity $\dot{X}$ |
| Ka | conductance coefficient for the active valve connected to node a |
| Kb | conductance coefficient for the active valve connected to node b |
| Ksa | conductance coefficient for valve sa between supply line and node a |
| Ksb | conductance coefficient for valve sb between supply line and node b |
| Kat | conductance coefficient for valve at between node a and return line |
| Kbt | conductance coefficient for valve bt between node b and return line |
| Keq | equivalent conductance coefficient |
| Kin | coefficient of a valve through which fluid flows into the cylinder |
| Kout | coefficient of a valve through which fluid flows out of the cylinder |
| Kv | generic term for a valve conductance coefficient |
| Pa | cylinder head chamber pressure |
| Pb | cylinder rod chamber pressure |
| Ps | supply line pressure |
| Pr | return line pressure |
| Peq | equivalent, or "driving", pressure |
| R | cylinder area ratio, Aa/Ab ($R \geqq 1.0$) |
| $\dot{X}$ | commanded velocity of the piston (positive in the extend direction) |

The mathematical derivation of the conductance coefficients depends on the metering mode for the function 20. Thus the valve control process will be described separately for the two powered metering modes.

1. Powered Extension Mode

When the hydraulic system 10 extends the piston rod 45 from the cylinder 16 pressurized hydraulic fluid is applied from the supply line 14 to the head chamber 26 and fluid is exhausted from the rod chamber 27 into the tank return line 18. This metering mode is referred to as the "Powered Extension Mode." In general, this mode is utilized when the force Fx acting on the piston 28 is negative and work must be done against that force in order to extend the piston rod 45 from cylinder 16. To produce that motion, the first and fourth electrohydraulic valves 21 and 24 are opened, while the other pair of valves 22 and 23 is kept closed.

The velocity of the rod extension is achieved by metering fluid through the first and fourth valves 21 and 24 which in turn is controlled by values set for the respective valve conductance coefficients Ksa and Kbt. In theory the specific values for the individual valve conductance coefficients Ksa and Kbt are irrelevant, as only the mathematical combination of those two coefficients, referred to as the equivalent conductance coefficient (Keq), is of consequence. Therefore, by knowing the cylinder area ratio R, the area in the rod cylinder chamber Ab, the cylinder chamber pressures Pa and Pb, the supply and return line pressures Ps and Pr, and the commanded piston rod velocity $\dot{x}$, the function controller 44 can execute a software routine 56 to compute the required equivalent conductance coefficient Keq from the equation:

$$Keq = \frac{\dot{x}Ab}{\sqrt{R(Ps - Pa) + (Pb - Pr)}}, \dot{x} > 0 \tag{1}$$

where the various terms in this equation and in the other equations in this document are specified in Table 1. If the desired velocity is zero, all four valves 21-24 are closed. If a negative velocity is desired, i.e. rod retraction, a different mode must be used. It should be understood that the calculation of the equivalent conductance coefficient Keq may yield a value that is greater than a maximum value that can be physically achieved given the constraints of the particular hydraulic valves and the cylinder area ratio R. In that case the maximum value for the equivalent conductance coefficient is used in subsequent arithmetic operations and the commanded velocity also is adjusted according to the expression:

$$\dot{x}=(Keq\ \max/Keq)\dot{x}.$$

The area Aa of the surface of the piston in the head chamber 26 and the piston surface area Ab in the rod chamber 27 are fixed and known for the specific cylinder 16 used in function 20. Knowing these surface areas and the present pressures Pa and Pb in the cylinder chambers, the equivalent external force Fx acting on the cylinder 16 can be determined by the function controller 44 according to either of the following expressions:

$$Fx=-Pa\ Aa+Pb\ Ab \tag{2}$$

$$Fx=Ab(-R\ Pa+Pb) \tag{3}$$

The equivalent external force (Fx) as computed from equation (2) or (3) includes the effects of external load on the cylinder, line losses between each respective pressure sensor Pa and Pb and the associated actuator port, and cylinder friction. The equivalent external force actually represents the total hydraulic load seen by the valve, expressed as a force.

Although the use of actuator port pressure sensors 36 and 38 to estimate this total hydraulic load is preferred, a load cell 43 could be used to estimate the equivalent external force (Fx). However, in this latter case, velocity errors may occur since cylinder friction and workport line losses are not be taken into account. The force Fx measured by the load cell is used in the term "Fx/Ab" which then is substituted for the terms "−RPa+Pb" in the expanded denominator of equation (1). Similar substitutions also would be made in the other expressions for equivalent conductance coefficient Keq hereinafter.

The driving pressure, Peq, required to produce movement of the piston rod 45 is given by:

$$Peq=R(Ps-Pa)+(Pb-Pr) \tag{4}$$

If the driving pressure is positive, the piston rod 45 will move in the intended direction (i.e. extend from the cylinder) when both the first and fourth electrohydraulic proportional valves 21 and 24 are opened. If the driving pressure is not positive, the first and fourth valves 21 and 24 must be kept closed to avoid motion in the wrong direction, until the supply pressure Ps is increased to produce a positive driving pressure Peq. If the present parameters indicate that movement of the piston rod 45 will occur in the desired direction, the valve coefficient routine 57 continues by employing the equivalent conductance coefficient Keq to derive individual valve conductance coefficients Ksa, Ksb, Kat and Kbt for the four electrohydraulic proportional valves 21-24.

In any particular metering mode two of the four electrohydraulic proportional valves are closed and thus have individual valve conductance coefficients of zero. For example, the second and third electrohydraulic proportional valves 22 and 23 are closed in the Powered Extension Mode. Thus, only the two open, or active, electrohydraulic proportional valves (e.g. valves 21 and 24 in this mode) contribute to the equivalent conductance coefficient (Keq). One active valve is connected to node "a" and the other active valve to node "b" of the valve assembly 25. In the following description of that valve coefficient routine 57, the term Ka refers to the individual conductance coefficient for the active input valve connected to node "a" (e.g. Ksa in the Powered Extension Mode) and Kb is the valve conductance coefficient for the active output valve connected to node "b" (e.g. Kbt in the Powered Extension Mode). The equivalent conductance coefficient Keq is related to the individual conductance coefficients Ka and Kb according to the expression:

$$Keq = \frac{K_a K_b}{\sqrt{K_a^2 + R^3 K_b^2}} \tag{5}$$

Rearranging this expression for each individual valve conductance coefficient, yields the following expressions:

$$Ka = \frac{R^{3/2} KbKeq}{\sqrt{Kb^2 - Keq^2}} \tag{6}$$

$$Kb = \frac{KaKeq}{\sqrt{Ka^2 - R^3 Keq^2}} \tag{7}$$

Figure 3:
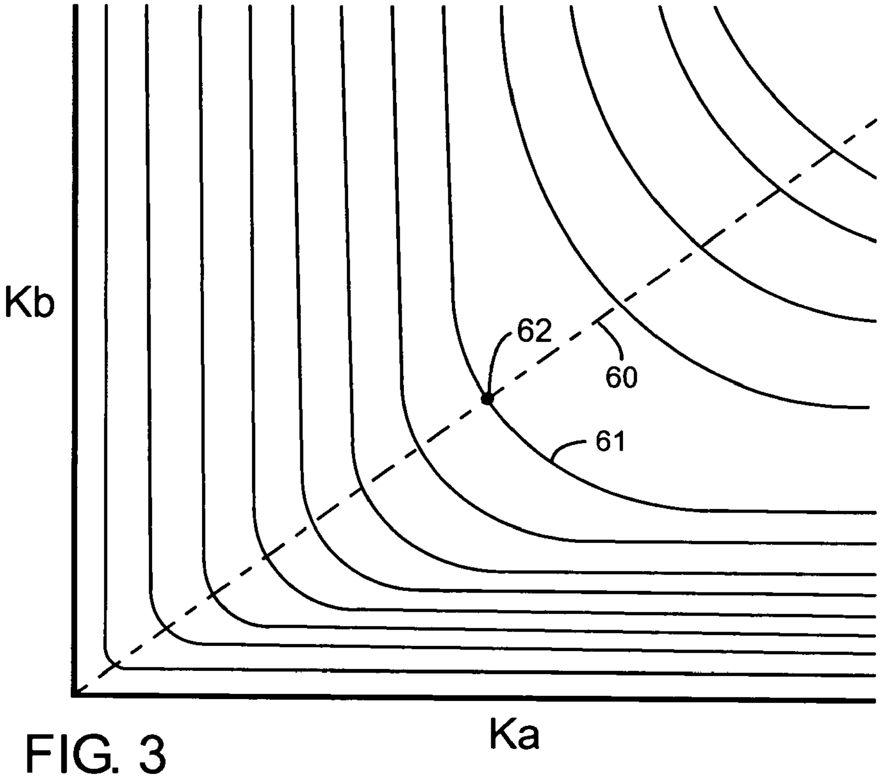
FIG. 3 depicts the relationship between flow coefficients Ka and Kb for a valve in the hydraulic system.

It is apparent, there are an infinite number of combinations of values for the valve conductance coefficients Ka and Kb, which equate to a given value of the equivalent conductance coefficient Keq. FIG. 3 graphically depicts the relationship between Ka and Kb wherein each solid curve represents a constant value of Keq. Note that there are in fact an infinite number of constant Keq curves with only some of them shown on the graph.

However, recognizing that actual electrohydraulic proportional valves used in the hydraulic system are not perfect, errors in setting the values for Ka and Kb inevitably will occur, which in turn leads to errors in the controlled velocity of the piston rod 45. Therefore, it is desirable to select values for Ka and Kb for which the error in the equivalent conductance coefficient Keq is minimized because Keq is proportional to the velocity x. The sensitivity of Keq with respect to both Ka and Kb can be computed by taking the magnitude of the gradient of Keq as given in vector differential calculus. The magnitude of the gradient of Keq is given by the equation:

$$|\nabla Keq(K_a, K_b)| = \sqrt{\frac{K_a^6 + R^6 K_b^6}{(K_a^2 + R^3 K_b^2)^3}} \tag{8}$$

A contour plot of the resulting two-dimensional sensitivity of Keq to valve conductance coefficients Ka and Kb has a valley in which the sensitivity is minimized for values of Ka and Kb at the bottom of the valley. The line at the bottom of that sensitivity valley is expressed by:

$$Ka = \mu\, Kb \tag{9}$$

where μ is the slope of the line. This line corresponds to the optimum or preferred valve conductance coefficient relationship between Ka and Kb to achieve the commanded velocity. The slope is a function of the cylinder area ratio R and can be found for a given cylinder design according to the expression $\mu = R^{3/4}$. For example, this relationship becomes Ka≅1.40 Kb for a cylinder area ratio of 1.5625. Superimposing a plot of the preferred valve conductance coefficient line 60 given by equation (9) onto the Keq curves of FIG. 3 reveals that the minimum coefficient sensitivity line intersects all the constant Keq curves.

In addition to equations (6) and (7) above, by knowing the value of the slope constant μ for a given hydraulic system function, the individual value coefficients are related to the equivalent conductance coefficient according to the expressions:

$$Ka = \sqrt{\mu^2 + R^3}\, Keq \tag{10}$$

$$Kb = \frac{\sqrt{\mu^2 + R^3}\, Keq}{\mu} \tag{11}$$

Therefore, two of expressions (6), (7), (10) and (11) can be solved to determine the valve conductance coefficients for the active valves in the powered extension metering mode.

Referring again to FIG. 2, the valve coefficient routine 57 sets desired values for the valve conduction coefficients which define a desired fluid flow through the associated valve. For the example of hydraulic function 20 operating in the Powered Extension Mode, the desired valve conductance coefficient Ksb and Kat for the second and third electrohydraulic proportional valves 22 and 23 are set to zero by the valve coefficient routine 57 as these valves are kept closed. The desired conductance coefficients Ksa and Kbt for the active first and fourth hydraulic valves 21 and 24 are defined by the following specific applications of the generic equations (6), (7), (9), (10) and (11):

$$Ksa = \frac{R^{3/2} KbtKeq}{\sqrt{Kbt^2 - Keq^2}} \tag{12}$$

$$Kbt = \frac{KsaKeq}{\sqrt{Ksa^2 - R^3 Keq^2}} \tag{13}$$

$$Ksa = \mu Kbt \tag{14}$$

-continued $$Ksa = \sqrt{\mu^2 + R^3}\,Keq \quad (15)$$

$$Kbt = \frac{\sqrt{\mu^2 + R^3}\,Keq}{\mu} \quad (16)$$

In order to operate the valves in the range of minimal sensitivity, the valve coefficient routine 57 solves either both equations (15) and (16), or equation (16) and the resultant valve conductance coefficient then being used in equation (14) to derive the other valve conductance coefficient. In other circumstances, the desired values for the valve conductance coefficients can be derived using equations (12) or (13). For example, a value for one desired valve conductance coefficient value can be selected and the corresponding equation (12) or (13) can be used to derive the other desired valve conductance coefficient value. With reference to FIG. 3, if curve 61 represents the calculated equivalent conductance coefficient Keq, then the desired valve conductance coefficients Ksa and Kbt are defined by the intersection of the Keq curve 61 and the preferred valve conductance coefficient line 60 at point 62.

The resultant desired values for valve conductance coefficients Ksa, Ksb, Kat and Kbt, calculated by the valve coefficient routine 57, are supplied to a set of signal converters 58, which produce current setpoints Isp that specify the levels of electric current to operate the four electrohydraulic proportional valves 21-24. The current setpoints are applied to a set of valve drivers 59 which control the amount of current fed to each valve 21-24. It has been observed that the degree to which a valve opens in response to a given magnitude of electric current, and thus the corresponding valve conductance coefficient, varies with changes in differential pressure across the valve. In light of this phenomenon, the conversion of each desired valve conductance coefficient Ksa, Ksb, Kat, and Kbt into a current level also is a function of the differential pressure across the respective valve 21-24.

Figure 4:
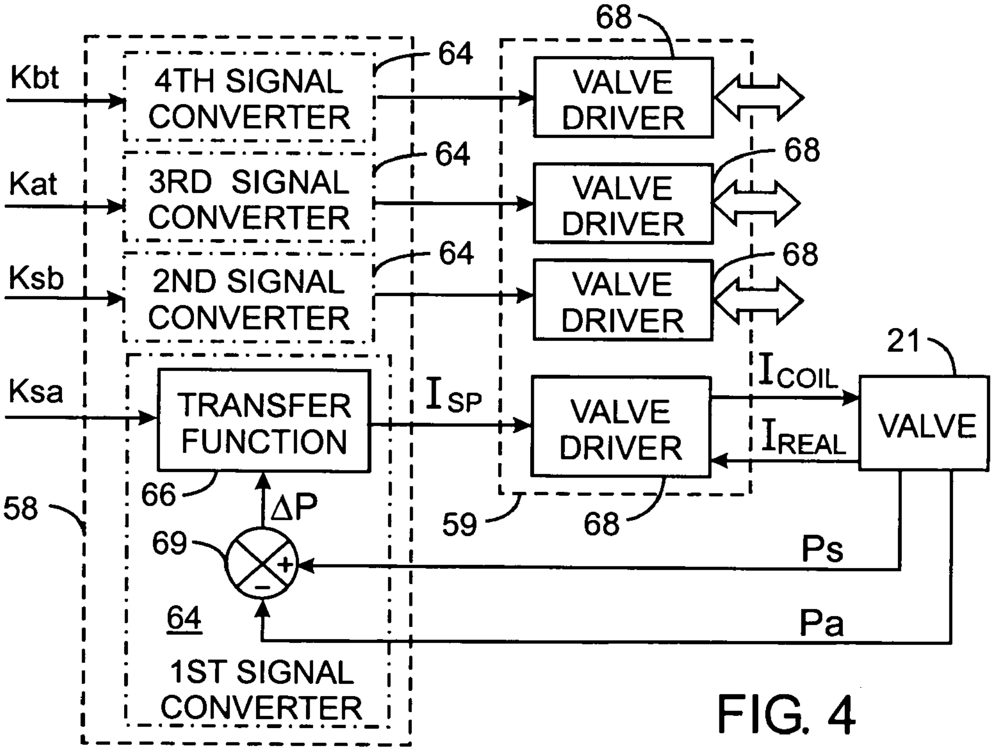
FIG. 4 is a diagram of the control function that sets values for the valve flow coefficients.

With reference to FIG. 4, that conversion is performed by a transfer function 66 in each signal converter 64 within set 58. That transfer function 66 generates the current setpoint (Isp) in response to both the desired valve conductance coefficient and the actual differential pressure. If the electrohydraulic proportional valves of a given design have very similar performance characteristics, then a single transfer function 66 can be used for all those valves. Otherwise where there is significant performance variation among valves of the same design, the performance of each valve must be characterized to produce a unique transfer function 66 for that particular electrohydraulic proportional valve.

Figure 5:
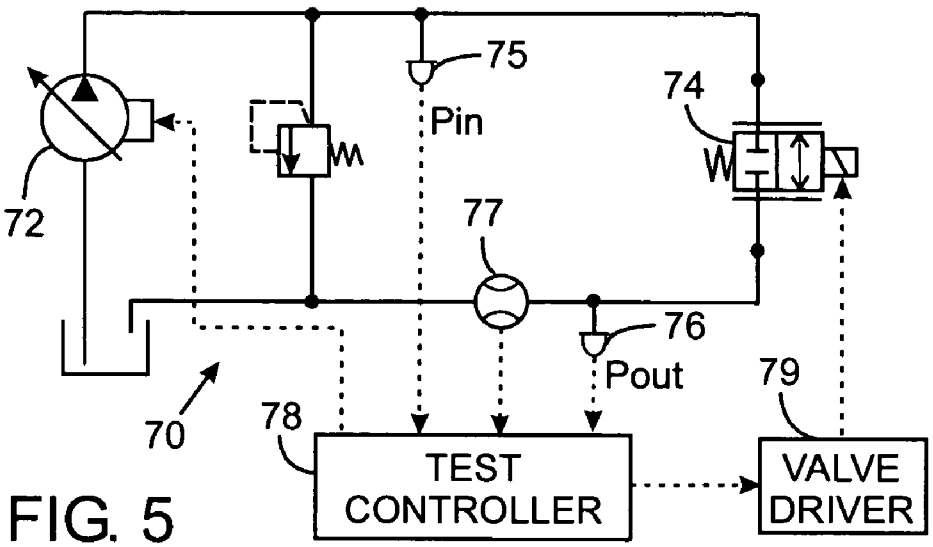
FIG. 5 is a test fixture for characterizing how differential pressure variation affects performance of a valve used in the hydraulic system.

In either case, the transfer function 66 is determined empirically using a test fixture 70, such as the one shown in FIG. 5. A variable displacement pump 72 supplies pressurized fluid to the valve 74 under test. Pressure sensors 75 and 76 produce electrical signals indicating the pressure on both sides of the valve and a flow meter 77 measures the fluid flow through the valve. These signals are applied as inputs to a test controller 78 which governs the operation of the pump 72 to control the outlet pressure. The test controller 78 also controls a valve driver 79 that applies the electric current to open the valve 74.

The relationship between valve coefficients and a corresponding electrical current levels depends upon properties of the type of hydraulic fluid used. Thus the test fixture 70 preferably uses a similar type of hydraulic fluid as will be used in the equipment on which the valves will be employed. If the type of hydraulic fluid used in the equipment changes a different transfer function 66 may be required.

During characterization of the transfer function 66, a series of current levels are produced to open the valve 74 different amounts. At each discrete current level, the differential pressure across the valve 74 is varied slowly through a range of values. At a plurality of test points data is gathered specifying the electric current magnitude, the differential pressure ΔP (Pin−Pout), and the fluid flow Q. For each data point, the actual valve conductance coefficient Kv is calculated according to the equation:

$$Kv = \frac{Q}{\sqrt{\Delta P}} \quad (17)$$

From this empirical data, a look-up table is created which has storage locations accessed by both a valve conductance coefficient value and a differential pressure value. Each storage location contains the electric current setpoint value (Isp) which is required at that differential pressure to produce the flow designated by the associated valve conductance coefficient Kv. Alternatively, the derivation of the electric current setpoint value (Isp) could be expressed by an equation as a function of the valve conductance coefficient value and a differential pressure value and the equation is solved to obtain the electric current setpoint value.

Referring again to FIG. 4, during operation of the hydraulic system 10, each of the four signal converters 64 in the set 58 produces an electric current setpoint (Isp) based on the valve conductance coefficient (e.g. Ksa) and differential pressure ΔP for the associated valve (e.g. 21). The differential pressure ΔP is determined by a second summation node 69 using the signals from the pressure sensors on opposite side of the respective electrohydraulic proportional valve (e.g. pressures Ps and Pa for the first valve 21). The resultant electrical current setpoint Isp is applied to an individual driver circuit 68 within the valve drivers 59 which controls application of electric current to the solenoid coil of the associated first or fourth electrohydraulic proportional valve 21 or 24. The resultant levels of electric current open those valves the proper amount to achieve the desired velocity of the piston rod 45.

2. Powered Retraction Mode

The piston rod 45 can be retracted into the cylinder 16 by applying pressurized hydraulic fluid from the supply line 14 to the rod chamber 27 and exhausting fluid from the head chamber 26 to the tank return line 18. This metering mode is referred to as the "Powered Retraction Mode". In general, this mode is utilized when the force acting on the piston 28 is positive and work must be done against that force to retract the piston rod 45. To produce this motion, the second and third electrohydraulic valves 22 and 23 are opened, while the other pair of electrohydraulic proportional valves 21 and 24 are closed.

The velocity of the rod retraction is controlled by metering fluid through both the second and third electrohydraulic proportional valves 22 and 23 as determined by the corresponding valve conductance coefficients Ksb and Kat. This control process is similar to that just described with respect to the Powered Extension Mode. Initially the function controller 44 uses routine 56 to calculate the equivalent conductance coefficient (Keq) according to the equation:

$$Keq = \frac{-\dot{x}Ab}{\sqrt{R(Pa-Pr)+(Ps-Pb)}},\ \dot{x}<0 \quad (18)$$

The driving pressure, Peq, required for producing movement of the piston rod 45 is given by:

$$Peq=R(Pa-Pr)+(Ps-Pb) \quad (19)$$

If the driving pressure is positive, the piston rod 45 will retract into the cylinder when both the second and third electrohydraulic proportional valves 22 and 23 are opened. If the driving pressure is not positive, the second and third valves 22 and 23 must be kept closed to avoid motion in the wrong direction, until the supply pressure Ps is increased to produce a positive driving pressure Peq.

Equations (2) and (3) can be used to determine the magnitude and direction of the external force acting on the piston rod 45.

The specific versions of the generic equations (6), (7), (9), (10) and (11) for the powered retraction mode are given by:

$$Kat = \frac{R^{3/2}KeqKsb}{\sqrt{Ksb^2 - Keq^2}} \quad (20)$$

$$Ksb = \frac{KatKeq}{\sqrt{Kat^2 - R^3Keq^2}} \quad (21)$$

$$Kat = \mu Ksb \quad (22)$$

$$Kat = \sqrt{\mu^2 + R^3}\,Keq \quad (23)$$

$$Ksb = \frac{\sqrt{\mu^2 + R^3}\,Keq}{\mu} \quad (24)$$

Therefore, the desired valve conductance coefficients Ksb and Kat for the active second and third electrohydraulic proportional valves 22 and 23 are derived by the value coefficient routine from equations (20)-(24). In order to operate the valves in the range of minimal sensitivity, either both equations (23) and (24) are solved or equation (24) is solved and the resultant desired valve conductance coefficient is used in equation (22) to derive the other desired valve conductance coefficient. In other cases, the desired valve conductance coefficients can be derived using equation (20) or (21). For example a value for one desired valve conductance coefficient can be selected and the corresponding equation (20) or (21) used to derive the other desired valve conductance coefficient. The desired valve conductance coefficients Ksa and Kbt for the closed first and fourth electrohydraulic proportional valves 21 and 24 are set to zero. The resultant set of four desired valve conductance coefficients are supplied by the function controller 44 to signal converters 58 to produce the corresponding electric current setpoints Isp in the same manner as described previously for the powered extension mode.

Alternative Valve Coefficient Compensation

The signal converter 58 described above requires either that all valves of a given design have substantially the same performance characteristics or that a separate transfer be defined for each specific electrohydraulic proportional valve being controlled. Fully characterizing the performance of every valve is a time consuming process. Alternatively sufficient compensation can be achieved in most hydraulic systems by characterizing the performance of each valve only at a nominal differential pressure and providing a generic set of differential pressure compensation values for all valves of the same design.

Figure 6:
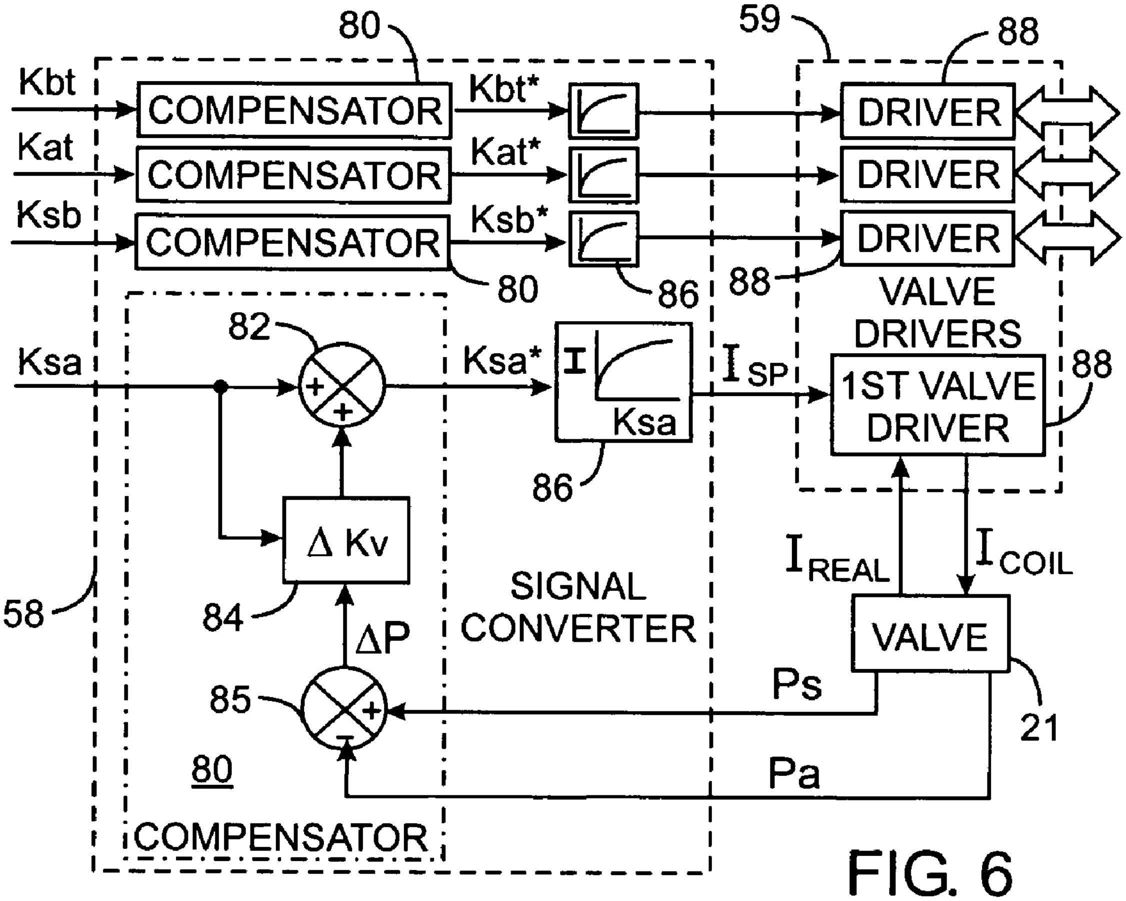
FIG. 6 is a diagram of the control function that adjusts the valve flow coefficients with a differential pressure compensation value.

FIG. 6 illustrates the details of the signal converter 58 for this alternative version of the present invention. The four desired valve conductance coefficients Ksa, Ksb, Kat and Kbt are produced by a valve coefficient routine 57, as described previously. A separate compensator 80 in the signal converter 58 processes each desired valve conductance coefficient to correct for the effects that varying differential pressure has on the valve control. The compensator 80 that processes the desired valve conductance coefficient Ksa for the first electrohydraulic proportional valve 21 is shown in detail, and the compensators for the other valves 22-24 have the same functionality. The present control procedures will be described with respect to controlling the first electrohydraulic proportional valve 21 with the understanding that the other electrohydraulic proportional valves 22-24 are controlled in a similar manner, but use the actual differential pressure across each respective valve. The desired valve conductance coefficient Ksa is applied to a first summation node 82 and to a compensation function 84 which produces a compensation value ΔKv. This compensator 80 receives input signals indicating the pressures Ps and Pa on opposite sides of the first electrohydraulic proportional valve 21. A second summation node 85 determines the difference between those pressure signals and produces value indicating the actual differential pressure ΔP across the associated valve 21. The differential pressure value is applied to the compensation function 84.

The compensation function 84 responds to the desired valve coefficient and the actual differential pressure ΔP by producing a coefficient compensation value ΔKv which adjusts the valve conductance coefficient Ksa to correct for variation in valve control due to different differential pressures ΔP. As noted previously, the opening of the electrohydraulic proportional valves in response to a given value of the valve conductance coefficient varies with changes in the differential pressure. The compensation function 84 provides a compensation value ΔKv which is established for valves of a particular design type, rather than for each the specific valve being controlled.

The compensation function 84 is determined by characterizing the performance of several electrohydraulic proportional valves of the same design and averaging that data. The characterization is carried out on a test fixture 70 shown in FIG. 5. The electric current applied to the valve 74 under test is stepped through the range of operating current levels and at each discrete current level, the differential pressure across the valve also is varied to define a plurality of test points. At each test point, the test controller stores data regarding the current magnitude, the differential pressure, and the fluid flow. For each data point, a valve conductance coefficient Kv value is calculated according to equation (17) and a two-axis table is created with the current steps along one axis and the differential pressure steps along the other axis. Each cell of that table contains the corresponding valve conductance coefficient Kv value.

A standard differential pressure (e.g. 2 MPa) is selected and the valve conductance coefficients in the table cells at that standard differential pressure are defined as nominal valve conductance coefficient values. The corresponding nominal valve conductance coefficient value for each step along the electric current axis of the table replace the electric current value so that the table becomes indexed by the nominal valve conductance coefficient and the differential pressure.

The data tables for several valves of the same design are gathered and data at corresponding cells are averaged to form a table of averaged test data.

Then, the nominal valve conductance coefficient value is subtracted from the contents of each averaged table cell associated with that coefficient value and the result is placed into the corresponding cell. This arithmetic operation converts the actual valve coefficient values in each table cell into a coefficient difference ΔKv. In the resultant table, the value in a given cell is the difference between the nominal valve conductance coefficient and the actual valve conductance coefficient at the associated differential pressure. This forms a look-up table for the compensation function 84 in FIG. 6. Alternatively, the compensation function 84 could be implemented as equation that expresses the coefficient difference ΔKv as a function of the desired valve conductance coefficient value and a differential pressure value and the equation is solved to obtain the coefficient difference.

Thus when a desired valve conductance coefficient Ksa produced by the valve coefficient routine 57 is applied to the compensation function 84, a coefficient compensation value ΔKv is produced which corresponds to how much the desired valve conductance coefficient must be changed to correct for the effects of the present differential pressure ΔP. The first summation node 82 combines the coefficient compensation value with the desired valve conductance coefficient Ksa to generate a compensated valve conductance coefficient Ksa* which is applied to a coefficient to current setpoint transfer function 86.

The transfer function 86 generates a corresponding electrical current setpoint (Isp) based on the incoming compensated valve conductance coefficient, Ksa* in this example. The transfer function 86 is unique to each particular electrohydraulic proportional valve 21-24 and defines the relationship between the valve conductance coefficient (Ksa, Ksb, Kat or Kbt) and the solenoid current setpoint (Isp) at the predefined standard differential pressure (e.g. 2 MPa). This relationship is characterized for each particular valve using the test fixture 70, in FIG. 5. While the pressure across the valve under test is held constant at the predefined standard differential pressure, the electric current applied to the valve is varied and the flow measured at predefined current levels. The corresponding valve conductance coefficient for each predefined current level is calculated using equation (17). From that data a look-table relating the valve conductance coefficient values to solenoid current setpoints (Isp) is created for the transfer function 86.

Therefore, the signal converter 58 compensates the desired valve conductance coefficient Ksa produced by the valve coefficient routine 57 for the effects of varying differential pressure. The compensated valve conductance coefficient Ksa* causes the transfer function 86 to produce a current setpoint Isp that is different than would be produced without compensation, but which opens the valve 21 to produce the fluid flow as defined by the value of the desired valve conductance coefficient.

Figure 7:
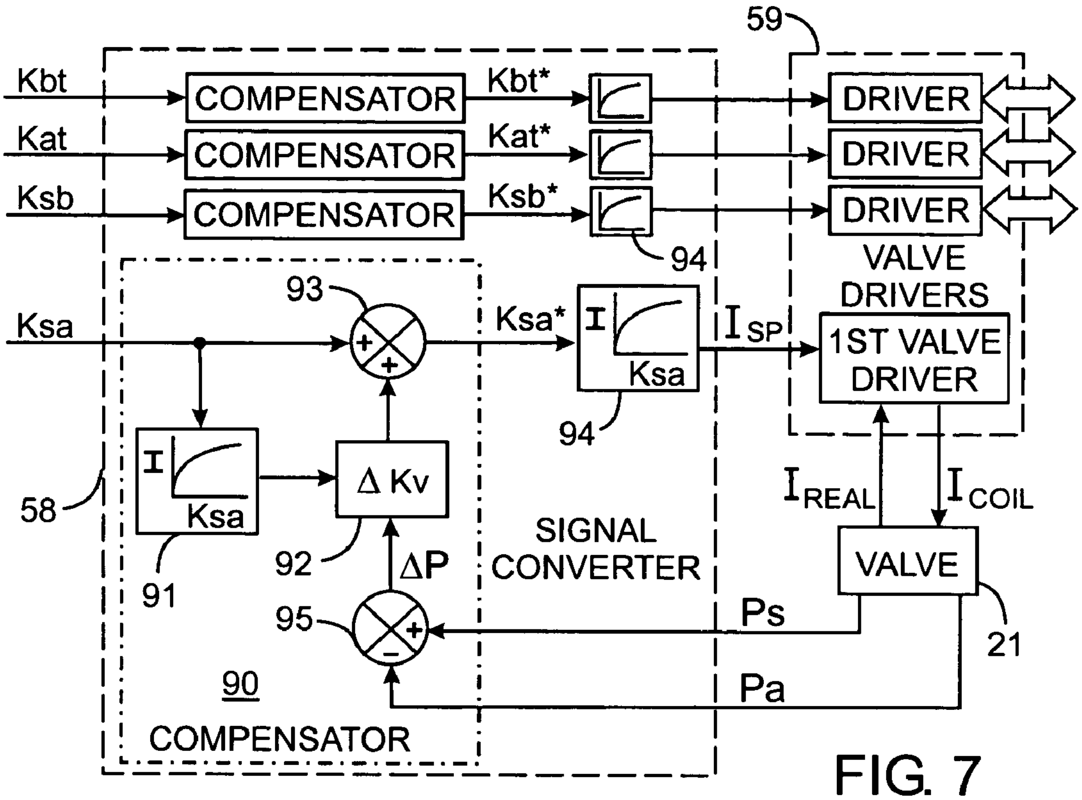
FIG. 7 is a diagram of another control function that adjusts the valve flow coefficients with a differential pressure compensation value.

Alternatively, the compensation data can be indexed by nominal current levels instead of valve conduction coefficient values. In this case shown in FIG. 7, the compensator 90 has a first transfer function 91 that converts the valve conductance coefficient (e.g. Ksa) into a corresponding current level using a look-up table that specifies the relationship of those parameters at the predefined standard differential pressure. That look-up table is created as described previously for the transfer function 86 in FIG. 6. The corresponding current level obtained from the first transfer function 91 is employed along with the differential pressure ΔP, produced by a second summation node 95, to address a look-up table in a compensation function 92. This look-up table of compensation values ΔKv is generated by essentially the same process as the compensation function 84, except that it is indexed by nominal current levels instead of valve conduction coefficient values.

The resultant compensation value ΔKv is combined with the desired valve conductance coefficient Ksa in the first summation node 93 to form a compensated valve conductance coefficient Ksa*. The compensated valve conductance coefficient is applied to a second transfer function 94 which uses the same look-up table as the first transfer function 91. The second transfer function 94 produces a current setpoint Isp which is applied to the valve drivers 59 to operate the first electrohydraulic valve 21.

Figure 8:
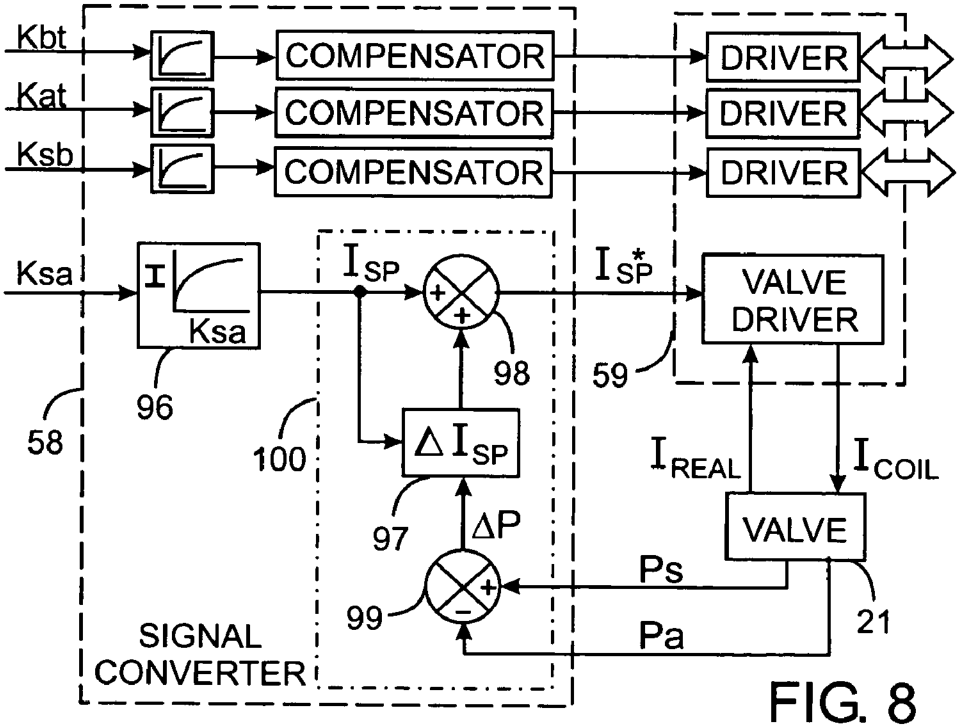
FIG. 8 is a diagram of the control function that adjusts the valve current setpoint with a differential pressure compensation value.

In another version of the present procedure shown in FIG. 8, compensation for differential pressure variation is performed by adjusting the electric current setpoint Isp. Here the desired valve conductance coefficient Ksa from the valve coefficient routine 57 is applied directly to the valve current transfer function 96 which produces the electric current setpoint Isp. The electric current setpoint and the differential pressure ΔP are used to address the look-up table of a compensation function 97 in a compensator 100 to obtain a current compensation value ΔIsp. This current compensation value adjusts the electric current setpoint Isp to compensate for valve control fluctuations due to variation of the differential pressure. Specifically the current compensation value ΔIsp is combined with the current setpoint Isp at a first summation node 98 to form a compensated current setpoint Isp*, which is applied to the valve drivers 59 to operate the first electrohydraulic proportional valve 21. The look-up table of current compensation values is created empirically for a given valve design using the test fixture in FIG. 5 and a similar procedure to that used to create the previously described tables of compensation values.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. For example the present compensation technique can be used with other types of hydraulic actuators than a cylinder and piston actuator and other valve assemblies. Accordingly, the scope of the invention should be determined from the following claims and not limited by the above disclosure.

What is claimed is:

1. An apparatus for operating an electrohydraulic valve that controls flow of fluid to operate a hydraulic actuator, said apparatus comprising:

a component which produces a desired valve flow coefficient that specifies one of conductivity or resistivity of the electrohydraulic valve;

a sensor arrangement from which a differential pressure value is produced that indicates a pressure difference across the electrohydraulic valve;

a signal converter connected to the component and the sensor arrangement, and comprising a transfer function which converts the desired valve flow coefficient into an electric current level, a compensation function which determines a compensation value in response to the electric current level and the differential pressure value, and a signal processing element which combines the compensation value with the electric current level to produce a compensated current level; and a valve driver that activates the electrohydraulic valve in response to the compensated current level.

2. An apparatus for operating an electrohydraulic valve that controls flow of fluid to operate a hydraulic actuator, said apparatus comprising:

a component which produces a desired valve flow coefficient that specifies one of conductivity or resistivity of the electrohydraulic valve;

a sensor arrangement from which a differential pressure value is produced that indicates a pressure difference across the electrohydraulic valve;

a signal converter connected to the component and the sensor arrangement, and producing a compensation value in response to the desired valve flow coefficient and the differential pressure value, summing the compensation value with the desired valve flow coefficient to produce a compensated valve flow coefficient, which is compensated for effects that variation of differential pressure has on the flow of fluid, and employing the compensated valve flow coefficient to produce a valve control signal; and a valve driver which activates the electrohydraulic valve in response to the valve control signal.

3. The apparatus as recited in claim 2 further comprising a device which produces a motion signal designating a desired movement of the hydraulic actuator;

and wherein the component produces the desired valve flow coefficient in response to the motion signal.

4. The apparatus as recited in claim 2 wherein the compensation value compensates for effects that variation of differential pressure across the electrohydraulic valve have on the fluid flow.

5. The apparatus as recited in claim 2 wherein the compensation value specifies an amount that a valve flow coefficient varies from a nominal value with changes in the pressure difference across the electrohydraulic valve.

6. The apparatus as recited in claim 2 wherein the signal converter further comprises a transfer function which converts the compensated valve flow coefficient into an electric current level.

7. A method of operating an electrohydraulic valve that controls flow of fluid to operate a hydraulic actuator, said method comprising:

characterizing performance of the electrohydraulic valve by producing characterization data that specify how a valve flow coefficient, which specifies one of conductivity or resistivity of the electrohydraulic valve, varies with changes in differential pressure across the electrohydraulic valve;

specifying desired movement of the hydraulic actuator;

in response to the desired movement, deriving a desired value for the valve flow coefficient;

sensing a differential pressure across the electrohydraulic valve;

producing a compensation value from the desired value for the valve flow coefficient, the differential pressure, and the characterization data;

summing the compensation value with the desired value for the valve flow coefficient to produce a compensated control signal that is compensated for effects that changes in differential pressure have on flow of fluid through the electrohydraulic valve; and activating the electrohydraulic valve in response to the compensated control signal.

8. The method as recited in claim 7 wherein the characterization data specifies how the valve flow coefficient varies from a nominal value with changes in the differential pressure across the electrohydraulic valve.

9. The method as recited in claim 7 wherein sensing a differential pressure comprises sensing a first pressure on one side of the electrohydraulic valve; sensing a second pressure on another side of the electrohydraulic valve; and deriving the differential pressure across the electrohydraulic valve from the first and second pressures.

10. The method as recited in claim 7 further comprises further comprising converting the compensated control signal into a current setpoint value that specifies a level of electric current to operate the electrohydraulic valve.

11. The method as recited in claim 7 wherein:

the characterization data specifies an electric current level to apply to the electrohydraulic valve as a function of the valve flow coefficient and the differential pressure; and summing the compensation value with the desired value for the valve flow coefficient comprises converting the desired value for the valve flow coefficient to an electric current setpoint and summing the compensation value with the electric current setpoint to produce the compensated control signal.

12. The method as recited in claim 7 wherein the characterizing produces characterization data that specifies how the valve flow coefficient varies as a function of the differential pressure and electric current levels for activating the electrohydraulic valve.

13. The method as recited in claim 12 wherein the compensated control signal is a current setpoint value that specifies a level of electric current to operate the electrohydraulic valve.

14. An apparatus for operating an electrohydraulic valve that controls flow of fluid to operate a hydraulic actuator, said apparatus comprising:

a device which produces a motion signal designating a desired movement of the hydraulic actuator;

a component that responds to the motion signal by producing a desired valve flow coefficient that specifies one of a desired conductivity and or a desired resistivity of the electrohydraulic valve;

a sensor arrangement from which a differential pressure value is produced indicating a fluid pressure difference across the electrohydraulic valve;

a compensation function which produces a compensation value in response to the desired valve flow coefficient and the differential pressure value;

a signal processing element which combines the compensation value with the desired valve flow coefficient to produce a compensated valve flow coefficient;

a transfer function which converts the compensated valve flow coefficient into an electric current setpoint; and a valve driver which activates the electrohydraulic valve in response to the electric current setpoint.

15. The apparatus as recited in claim 14 wherein the compensation value compensates for effects that variation of differential pressure across the electrohydraulic valve have on the flow of fluid.

16. The apparatus as recited in claim 14 wherein the compensation value specifies an amount that a valve flow coefficient varies from a nominal value with changes in the pressure difference across the electrohydraulic valve.

* * * * *